United States Patent Office
3,201,391
Patented Aug. 17, 1965

3,201,391
6α,9α,11β-TRICHLORO AND 6α-FLUORO-9α,11β-
DICHLORO PREGNENES
Albert Bowers, Mexico City, Mexico, assignor, by mesne
assignments, to Syntex Corporation, a corporation of
Panama
No Drawing. Filed Feb. 18, 1960, Ser. No. 9,435
Claims priority, application Mexico, Feb. 18, 1959,
53,717; Oct. 20, 1959, 56,285
22 Claims. (Cl. 260—239.55)

The present invention relates to novel cyclopentano-phenanthrene derivatives and to a novel process for the preparation thereof.

More particularly the invention relates to novel 6α,9α,11β-trichloro and 6α-fluoro-9α,11β-dichloro-Δ⁴-pregnenes and Δ¹,⁴-pregnadienes of the following formula:

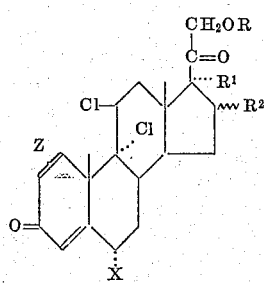

In the above formula R represents hydrogen or a hydrocarbon carboxylic acyl group containing from 1 to 12 carbon atoms; R' represents hydroxy or an acyloxy group derived from a hydrocarbon carboxylic acid containing from 1 to 12 carbon atoms; R² represents hydrogen, α-methyl, β-methyl, α-hydroxy or α-acyloxy wherein the acyl group is derived from a hydrocarbon carboxylic acid containing from 1 to 12 carbon atoms; and R' and R² jointly may represent the grouping

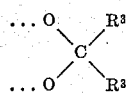

in which R³ represents hydrogen or hydrocarbon groups such as aliphatic radicals containing from 1 to 8 carbon atoms or aromatic groups containing from 6 to 12 carbon atoms. Such ketals or acetals are formed by the reaction of the 16α,17α-dihydroxy compound with an aldehyde or ketone such as acetone, methylethylketone, butanone, cyclohexanone, formaldehyde, acetaldehyde and furfural. X represents chlorine or fluorine.

The acyl groups are derived from hydrocarbon carboxylic acids containing from 1 to 12 carbon atoms and may be saturated or unsaturated, straight chain or branched chain aliphatic, cyclic, cyclic-aliphatic, aromatic and may be substituted by hydroxy, an acyloxy group containing from 1 to 12 carbon atoms, an alkoxy group containing from 1 to 5 carbon atoms or by halogen such as fluorine, chlorine or bromine. Typical ester groups are the acetate, propionate, butyrate, hemisuccinate, enanthate, caproate, benzoate, trimethylacetate, phenoxyacetate, phenylpropionate and β-chloropropionate.

The novel compounds of the present invention are valuable steroids having pronounced anti-inflamatory, glucocorticoid and anti-estrogenic activity. The novel trihalo compounds are of particular value since they can be administered topically without producing systemic effects when used for the alleviation of inflammatory conditions.

The preparation of the novel compounds which form the subject matter of the present invention may be illustrated by the following equation:

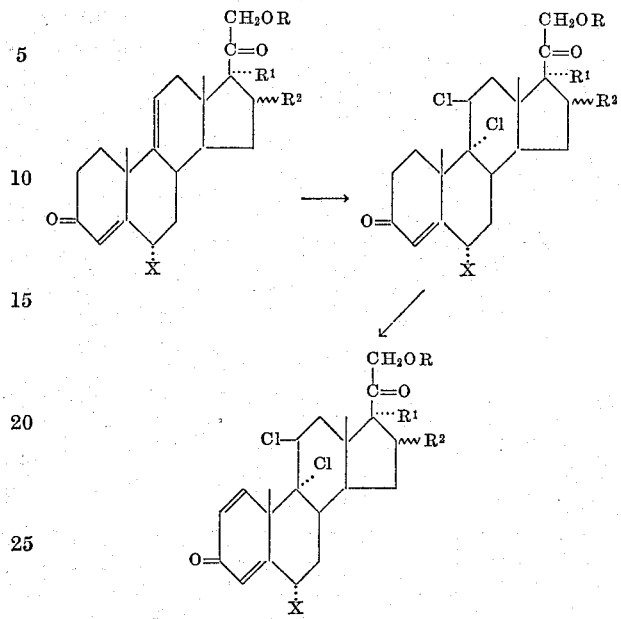

In the above equation, R, R', R² and X represent the same groups as heretofore set forth.

In practicing the process above outlined the Δ⁴,⁹⁽¹¹⁾-pregnadiene-3,20-dione compounds are treated with 1 molar equivalent of chlorine in an inert solvent such as carbon tetrachloride or methylene chloride to produce the corresponding 9α,11β-dichloro-Δ⁴-pregnene-3,20-dione compounds. For introduction of the double bond between C-1 and C-2, the compounds can be treated by known chemical methods as for example with selenium dioxide in tertiary-butanol in the presence of catalytic amounts of pyridine or by microbiological methods as for example, incubation with *Corynebacterium simplex* ATCC 6946.

The starting Δ⁴,⁹⁽¹¹⁾ compounds are obtained by dehydration of the corresponding known Δ⁴-11-hydroxy compounds by treatment of the latter with an organic sulfonyl chloride and more particularly methanesulfonyl chloride in a solvent such as dimethylformamide in the presence of a tertiary amine such as pyridine.

The ester groups at C-21 and C-16 are formed in the conventional manner by treating a pyridine solution of the steroid with the respective acid anhydride or chloride; the hydroxyl group at C-17 is esterified by reaction with acetic anhydride and acetic acid in the presence of p-toluenesulfonic acid when the acetate is desired or with other acid anhydrides in benzene solution in the presence of p-toluenesulfonic acid. If the free compounds are desired, the ester groups are hydrolyzed by alkaline treatment as for example with dilute methanolic potassium hydroxide solution at low temperature and under an atmosphere of nitrogen.

Similarly, potent progestational agents such as 9α,11β-dichloro-progesterone, 9α,11β-dichloro-19-nor-progesterone, 9α,11β-dichloro-17α-hydroxy-progesterone, 9α,11β-dichloro-17α-acyloxy-progesterone, particularly the acetoxy, propionoxy, and the Δ¹ derivatives of all the foregoing, can be prepared in the same manner from the corresponding Δ⁴,⁹⁽¹¹⁾-pregnadiene-3,20-dione; 19-nor-Δ⁴,⁹⁽¹¹⁾-pregnadiene-3,20-dione and from 17α-hydroxy and 17α-hydrocarbon carboxylic acyloxy-Δ⁴,⁹⁽¹¹⁾-pregnadiene-3,20-dione which in turn are prepared from the corresponding Δ⁴-pregnene-11-hydroxy compounds in the manner set forth above.

The following preparations and examples serve to illustrate but are not intended to limit the present invention:

PREPARATION 1

A mixture of 4 g. of 6α-fluoro-hydrocortisone-acetate, 2 g. of methanesulfonyl chloride, 60 cc. of dimethylformamide and 4 cc. of pyridine was heated at 80° C. for one hour, cooled, diluted with water and the product was extracted with ethyl acetate; the extract was washed with water, dried over anhydrous sodium sulfate and the ethyl acetate was evaporated. By recrystallization of the residue from acetone-hexane there was obtained 6α-fluoro-$\Delta^{4,9(11)}$-pregnadiene-17α,21-diol-3,20-dione 21-acetate.

PREPARATION 2

By following the method described in Preparation 1, 16α-methyl-6α-fluoro-hydrocortisone 21-acetate described in copending application Serial No. 789,242, filed on January 27, 1959, and 16β-methyl-6α-fluoro-hydrocortisone 21-acetate described in copending application Serial No. 792,962, filed on February 13, 1959, now abandoned, were converted into the corresponding 16α-methyl-6α-fluoro-$\Delta^{4,9(11)}$-pregnadiene-17α,21-diol-3,20-dione 21-acetate and 16β-methyl-6α-fluoro-$\Delta^{4,9(11)}$-pregnadiene-17α,21-diol-3,20-dione.

PREPARATION 3

By following the method described in Preparation 1, 6α-chloro-16α-hydroxy-hydrocortisone - 16α,21 - diacetate described in copending application Serial No. 753,626 filed on August 7, 1958, now U.S. Patent No. 2,997,489, issued August 22, 1961, and the 16α,17α-acetonide of 6α-chloro-16αhydroxy-hydrocortisone 21-acetate described in copending application Serial No. 819,545, filed June 11, 1959, now U.S. Patent No. 3,126,375, issued March 24, 1964, were converted into the corresponding 6α-chloro-$\Delta^{4,9(11)}$-pregnadiene-16α,17α,21 - triol - 3,20-dione-16α,21-diacetate and the 16α,17α-acetonide of 6α-chloro-$\Delta^{4,9(11)}$-pregnadiene-16α,17α,21-triol-3,20-dione 21 - acetate.

PREPARATION 4

By following the method described in Preparation 1, there were obtained 6α-chloro-16β-methyl-$\Delta^{4,9(11)}$-pregnadiene-17α,21-diol-3,20-dione 21-acetate and 6α-chloro-16α-methyl-$\Delta^{4,9(11)}$-pregnadiene-17α,21-diol,3,20-dione 21-acetate from the corresponding 6α-chloro-16β-methyl-hydrocortisone 21-acetate described in copending application Serial No. 824,200, filed July 1, 1959, now abandoned, and from the 6α-chloro-16α-methyl-hydrocortisone 21-acetate described in copending application Serial No. 825,655, filed on July 8, 1959, now abandoned.

PREPARATION 5

By following the method of Preparation 1, 6α-chloro-hydrocortisone-21-acetate described by Ringold et al. in J. Am. Chem. Soc., volume 80, pages 6464–6465, December 5, 1958, was converted into 6α-chloro-$\Delta^{4,9(11)}$-pregnadiene-17α,21-diol-3,20-dione-21-acetate.

PREPARATION 6

To 1.0 g. of 6-α-fluoro-16α-hydroxy-hydrocortisone 21-acetate, described by Mills et al. in J. Am. Chem. Soc., volume 81, pages 1264–1265, March 5, 1959, there was added 1 cc. of propionic anhydride in 10 ml. of dry pyridine. The reaction mixture was left at room temperature overnight and was then poured with stirring into ice water. The resulting precipitate was filtered, washed with water and crystallized from acetone-hexane to give 6α-fluoro-16α-hydroxy-hydrocortisone-16α-propionate 21-acetate. By following the method of Preparation 1, the latter compound was converted into 6α-fluoro-$\Delta^{4,9(11)}$-pregnadiene-16α,17α,21-triol-3,20-dione - 16α - propionate 21-acetate.

PREPARATION 7

By following the method of Preparation 1, the 16,17-acetonide of 6α-fluoro-16α-hydroxy-hydrocortisone 21-acetate, described by Mills et al. in J. Am. Chem. Soc., volume 81, pages 1264–1265, March 5, 1959, was converted into the corresponding 16,17-acetonide of 6α-fluoro-$\Delta^{4,9(11)}$-pregnadiene-16α,17α,21-triol-3,20-dione 21-acetate.

Example I

A solution of 1.6 g. of 6α-fluoro-$\Delta^{4,9(11)}$-pregnadiene-17α,21-diol-3,20-dione 21-acetate in 4 cc. of chloroform was treated under continuous stirring and in the course of 5 minutes with a solution of 324 mg. of chlorine in 10 cc. of carbon tetrachloride. The mixture was kept for 2 minutes at room temperature, then treated with 10 cc. of 5% aqueous sodium carbonate solution and the product was extracted several times with chloroform. The combined extract was washed with water to neutral, dried over anhydrous sodium sulfate and evaporated to dryness. The residue crystallized from acetone-hexane to yield 6α-fluoro-9α,11β-dichloro-$\Delta^4$-pregnene - 17α,21 - diol - 3,20-dione 21-acetate.

A solution of 500 mg. of the above compound in 24 cc. of t-butanol containing 0.08 cc. of pyridine was treated with 270 mg. of recently sublimed selenium dioxide and the mixture was refluxed with continuous stirring for 48 hours under an atmosphere of nitrogen. The solution was filtered through celite, the solvent was removed under reduced pressure and the residue was chromatographed on neutral alumina. There was thus obtained 6α-fluoro-9α,11β-dichloro-$\Delta^{1,4}$-pregnadiene - 17α,21-diol-3,20-dione 21-acetate.

A mixture of 1 g. of the above compound and 50 cc. of 1% methanolic potassium hydroxide solution was kept at a temperature around 0° C. for 1 hour under an atmosphere of nitrogen, acidified with acetic acid, concentrated to a small volume and diluted with water; the precipitate formed was collected by filtration, washed with water, dried and recrystallized from acetone-hexane, thus yielding the free 6α-fluoro-9α,11β-dichloro-$\Delta^{1,4}$-pregnadiene-17α,21-diol-3,20-dione.

A mixture of 500 mg. of the above compound, 5 cc. of pyridine and 1 cc. of propionic anhydride was kept overnight at room temperature, poured into water, heated on the steam bath for half an hour, cooled and the precipitate was collected, washed with water, dried and recrystallized from acetone-hexane, thus furnishing 6α-fluoro - 9α,11β-dichloro-$\Delta^{1,4}$-pregnadiene-17α,21-diol-3,20-dione 21-propionate.

A mixture of 300 mg. of the above compound, 15 cc. of glacial acetic acid, 3 cc. of acetic anhydride and 300 mg. of p-toluenesulfonic acid was kept overnight at room temperature and then poured into water; the mixture was heated on the steam bath for half an hour, cooled and the precipitate was collected, washed with water, dried and recrystallized from acetone-hexane. There was thus obtained 6α-fluoro-9α,11β-dichloro-$\Delta^{1,4}$-pregnadiene-17α,21-diol-3,20-dione 17-acetate-21-propionate.

Example II

A solution of 1 g. of 6α-fluoro-9α,11β-dichloro-$\Delta^4$-pregnene-17α,21-diol-3,20-dione 21-acetate of the previous example, in 50 cc. of benzene was mixed with 3 g. of caproic anhydride and 1 g. of p-toluenesulfonic acid and kept at room temperature for 72 hours. The mixture was then consecutively washed with water, 5% sodium carbonate solution and again with water to neutral, dried over anhydrous sodium sulfate and evaporated to dryness. By chromatography of the residue on neutral alumina there was obtained 6α-fluoro-9α,11β-dichloro-$\Delta^4$-pregnene-17α,21-diol-3,20-dione 17-caproate-21-acetate.

Example III

By essentially following the procedure described in Example I, 5 g. of 6α-fluoro-16α-methyl-$\Delta^{4,9(11)}$-pregnadiene- 17α,21-diol-3,20-dione 21-acetate was converted into 6α-fluoro - 16α - methyl-9α,11β-dichloro-Δ⁴-pregnene-17α,21-diol-3,20-dione 21-acetate and then into 6α-fluoro-16α-methyl - 9α,11β - dichloro - Δ$^{1,4}$-pregnadiene-17α,21-diol-3,20-dione 21-acetate.

*Example IV*

By essentially following the procedure described in Example I, 5 g. of 6α-chloro-Δ$^{4,9(11)}$-pregnadiene-16α,17α,21-triol-3,20-dione 16,21-diacetate was converted into 6α,9α,11β-trichloro-Δ⁴-pregnene-16α,17α,21-triol-3,20-dione 16,21-diacetate and then into 6α,9α,11β-trichloro-Δ$^{1,4}$-pregnadiene-16α,17α,21-triol-3,20-dione 16,21-diacetate; by the hydrolysis with methanolic potassium hydroxide there was obtained the free 6α,9α,11β-trichloro-Δ$^{1,4}$-pregnadiene-16α,17α,21-triol-3,20-dione.

A mixture of 2 g. of the latter compound, 50 cc. of acetone and 1 cc. of 70% perchloric acid was kept at room temperature for 1 hour, neutralized with sodium bicarbonate solution and diluted with saturated aqueous sodium chloride solution; the precipitate was collected, washed with a little cold water, dried and recrystallized from acetone-hexane, thus giving the 16,17-acetonide of 6α,9α,11β - trichloro-Δ$^{1,4}$-pregnadiene-16α,17α-21-triol-3,20-dione.

Upon subsequent treatment with acetic anhydride in pyridine solution there was obtained the 16,17-acetonide of 6α,9α,11β-trichloro-Δ$^{1,4}$-pregnadiene-16α,17α,21-triol-3,20-dione 21-acetate.

*Example V*

A mixture of 1 g. of 6α,9α,11β-trichloro-Δ⁴-pregnene-16α,17α,21-triol-3,20-dione 16,21-diacetate, intermediate in the previous example, and 50 cc. of a 1% solution of potassium hydroxide in methanol was kept at 0° C., under the conditions described for this hydrolysis in Example I; there was thus obtained the free 6α,9α,11β-trichloro-Δ⁴-pregnene-16α,17α,21-triol-3,20-dione.

A solution of 500 mg. of the above compound in 50 cc. of chloroform was treated with 2 g. of paraldehyde and a few drops of 3 N perchloric acid and stirred at room temperature for 2 hours. After diluting with water the chloroform layer was separated, washed with aqueous saturated bicarbonate solution and then with water, the chloroform was distilled and the residue was purified by chromatography on neutral alumina, thus yielding the 16,17-acetaldehyde-acetal of 6α,9α,11β-trichloro-Δ⁴-pregnene-16α,17α,21-triol-3,20-dione. Upon subsequent treatment with propionic anhydride in pyridine solution (cf. of Example I) there was obtained the 21-propionate of the latter compound.

*Example VI*

By applying the method of Example I, to the 16,17-acetonide of 6α-chloro-Δ$^{4,9(11)}$-pregnadiene-16α,17α-21-triol-3,20-dione 21-acetate there was obtained in the step of chlorination the 16,17-acetonide of 6α,9α,11β-trichloro-Δ⁴-pregnene-16α,17α,21-triol-3,20-dione 21-acetate, which upon subsequent dehydrogenation with selenium dioxide afforded the 16,17-acetonide of 6α,9α,11β-trichloro-Δ$^{1,4}$-pregnadiene-16α,17α,21-triol-3,20-dione 21-acetate, identical with the final compound of Example IV.

*Example VII*

In accordance with the method described in Example I, 5 g. of 6α-fluoro-16β-methyl-Δ$^{4,9(11)}$-pregnadiene-17α,21-diol-3,20-dione 21-acetate was converted into 6α-fluoro-16β - methyl - 9α,11β-dichloro-Δ⁴-pregnene-17α,21-diol-3,20-dione 21-acetate and then into 6α-fluoro-16β-methyl-9α,11β - dichloro-Δ$^{1,4}$-pregnadiene-17α,21-diol-3,20-dione 21-acetate.

*Example VIII*

By essentially following the method described in Example IV, 6α-fluoro-Δ$^{4,9(11)}$-pregnadiene-16α,17α,21-triol-3,20-dione-16,21-diacetate was converted into 6α-fluoro-9α,11β - dichloro-Δ⁴-pregnene-16α,17α,21-triol-3,20-dione-16,21-diacetate and then into 6α-fluoro-9α,11β-dichloro-Δ$^{1,4}$ - pregnadiene - 16α,17α,21-triol-3,20-dione-16,21-diacetate; by hydrolysis with methanolic potassium hydroxide there was obtained the free 6α-fluoro-9α,11β-dichloro-Δ$^{1,4}$-pregnadiene-16α,17α,21-triol-3,20-dione.

By treatment with acetone in the presence of perchloric acid as set forth in Example IV, the 16,17-acetonide of 6α- - fluoro - 9α,11β - dichloro - Δ$^{1,4}$ - pregnadiene 16α,17α,21-triol-3,20-dione was formed, which upon subsequent treatment with acetic anhydride in pyridine solution was transformed into the 16,17-acetonide of 6α-fluoro - 9α,11β - dichloro - Δ$^{1,4}$ - pregnadiene - 16α,17α,21-triol-3,20-dione 21-acetate.

*Example IX*

The 16,21-diacetate of 6α-fluoro-9α,11β-dichloro-Δ⁴-pregnene - 16α,17α,21 - triol - 3,20 - dione described in Example VIII was hydrolyzed in the manner set forth in Example V to produce the free 6α-fluoro-9α,11β-dichloro Δ⁴ - pregnene - 16α,17α,21 - triol - 3,20-dione and then subsequently treated with paraldehyde as described in the aforementioned Example V to produce the 16,17-acetaldehyde acetal of 6α-fluoro-9α,11β-dichloro-Δ⁴-pregnene - 16α,17α - 21 - triol - 3,20 - dione.

*Example X*

By applying the method of Example I to the 16,17-acetonide of 6α-fluoro - Δ$^{4,9(11)}$ - pregnadiene-16α,17α,21-triol-3,20-dione 21-acetate, there was obtained the 16,17-acetonide of 6α-fluoro-9α,11β-dichloro-Δ⁴-pregnene-16α,17α,21 - triol - 3,20 - dione 21-acetate. Dehydrogenation with selenium dioxide under the conditions described in Example I afforded the 16,17-acetonide of 6α-fluoro-9α,11β - dichloro - Δ$^{1,4}$ - pregnadiene - 16α,17α, 21 - triol-3,20-dione 21-acetate, identical with the final compound of Example VIII.

*Example XI*

By following the methods of Example I, 6α-chloro-Δ$^{4,9(11)}$ - pregnadiene - 17α,21 - diol - 3,20 - dione 21 acetate was converted into 6α,9α,11β-trichloro-Δ⁴-pregnene-17α,21-diol-3,20-dione 21-acetate and then into 6α,9α,11β-trichloro - Δ$^{1,4}$ - pregnadiene - 17α,21 - diol - 3,20 - dione 21-acetate.

*Example XII*

By following the method of Example II, 6α,9α,11β-trichloro - Δ⁴ - pregnene - 17α,21 - diol - 3,20 - dione 21-acetate described in the preceding example was treated with propionic anhydride to produce 6α,9α,11β-trichloro-Δ⁴ - pregnene - 17α,21 - diol - 3,20 - dione - 17α-propionate 21-acetate.

*Example XIII*

By following the method of Example I, 6α-chloro-16α - methyl - Δ$^{4,9(11)}$ - pregnadiene - 17α,21 - diol - 3,20-dione 21-acetate and the corresponding 16β-methyl derivative were converted into 6α,9α,11β-trichloro-16α-methyl - Δ⁴ - pregnene - 17α,21 - diol - 3,20 - dione 21-acetate and 6α,9α,11β - trichloro - 16β - methyl - Δ⁴ - pregnene-17α,21-diol-3,20-dione 21-acetate. Upon subsequent dehydrogenation with selenium dioxide the corresponding 6α,9α,11 - trichloro - 16α - methyl - Δ$^{1,4}$ - pregnadiene-17α,21 - diol - 3,20 - dione 21-acetate and 6α,9α,11β-trichloro - 16β - methyl - Δ$^{1,4}$ - pregnadiene - 17α,21-diol-3,20-dione 21-acetate were obtained.

By following the saponification method with 1% methanolic potassium hydroxide solution, described in Example I, the acetate derivatives listed below under I were converted into the corresponding free compounds, listed under II.

| Example | I | II |
|---|---|---|
| XIV | 6α,9α,11β-trichloro-Δ⁴-pregnene-17α,21-diol-3,20-dione 21-monoacetate. | 6α,9α,11β-trichloro-Δ⁴-pregnene-17α,21-diol-3,20-dione. |
| XV | 6α-fluoro-9α,11β-dichloro-Δ⁴-pregnene-17α,21-diol-3,20-dione-21-monoacetate. | 6α-fluoro-9α,11β-dichloro-Δ⁴-pregnene-17α,21-diol-3,20-dione. |
| XVI | 6α-fluoro-9α,11β-dichloro-16α-methyl-Δ⁴-pregnene-17α,21-diol-3,20-dione-21-monoacetate. | 6α-fluoro-9α,11β-dichloro-16α-methyl-Δ⁴-pregnene-17α,21-diol-3,20-dione. |
| XVII | 6α-fluoro-9α,11β-dichloro-16β-methyl-Δ¹,⁴-pregnadiene-17α,21-diol-3,20-dione-21-monoacetate. | 6α-fluoro-9α,11β-dichloro-16β-methyl-Δ¹,⁴-pregnadiene-17α,21-diol-3,20-dione. |
| XVIII | 6α,9α,11β-trichloro-16β-methyl-Δ⁴-pregnene-17α,21-diol-3,20-dione-21-monoacetate. | 6α,9α,11β-trichloro-16β-methyl-Δ⁴-pregnene-17α,21-diol-3,20-dione. |
| XIX | 6α,9α,11β-trichloro-16α-methyl-Δ¹,⁴-pregnadiene-17α,21-diol-3,20-dione-21-monoacetate. | 6α,9α,11β-trichloro-16α-mehtyl-Δ¹,⁴-pregnadiene-17α,21-diol-3,20-dione. |

I claim:
1. A compound of the following formula:

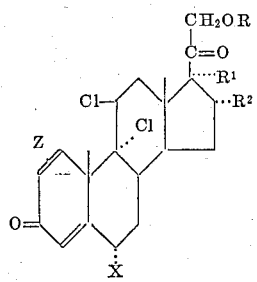

wherein X is selected from the group consisting of fluorine and chlorine; Z is selected from the group consisting of a double bond between C-1 and C-2 and a saturated linkage between C-1 and C-2; R is selected from the group consisting of hydrogen and a hydrocarbon carboxylic acyl group of less than 12 carbon atoms; R' is selected from the group consisting of hydroxy and a hydrocarbon carboxylic acyloxy group containing less than 12 carbon atoms; $R^2$ is selected from the group consisting of hydrogen, α-methyl, β-methyl, α-hydroxy and an α-hydrocarbon carboxylic acyloxy group containing up to 12 carbon atoms and R' and $R^2$ jointly represent the grouping

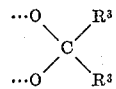

in which $R^3$ is selected from the grouping consisting of hydrogen, lower alkyl and aryl containing from 6 to 12 carbon atoms.

2. 6α,9α,11β-trichloro-Δ¹,⁴-pregnadiene-16α,17α,21-triol-3,20-dione.
3. 6α-fluoro-9α,11β-dichloro-Δ⁴-pregnene-17α,21,diol-3,20-dione
4. 6α-fluoro-9α,11β-dichloro-Δ¹,⁴-pregnadiene-17α,21-diol-3,20-dione.
5. 6α-fluoro-9α,11β-dichloro-Δ¹,⁴-pregnadiene-16α,17α,21-thiol-3,20-dione.
6. 6α-fluoro-9α,11β-dichloro-16α-methyl-Δ⁴-pregnene-17α,21-diol-3,20-dione.
7. The 16,17-acetonide of 6α,9α,11β-trichloro-Δ¹,⁴-pregnadiene-16α,17α,21-triol-3,20-dione.
8. The 16,17-acetonide of 6α-fluoro-9α,11β-dichloro-Δ¹,⁴-pregnadiene-16α,17α,21-triol-3,20-dione-21-acetate.
9. The 16,17-acetonide of 6α-fluoro-9α,11β-dichloro-Δ¹,⁴-pregnadiene-16α,17α,21-triol-3,20-dione.
10. The hydrocarbon carboxylic acid esters of less than 12 carbon atoms of 6α-fluoro-9α,11β-dichloro-16-methyl-Δ⁴-pregnene-17α,21-diol-3,20-dione.
11. The hydrocarbon carboxylic acid esters of less than 12 carbon atoms of 6α-fluoro-9α,11β-dichloro-16-methyl-Δ¹,⁴-pregnadiene-17α,21-diol-3,20-dione.
12. 6α-fluoro-9α,11β-dichloro-16α-methyl - Δ¹,⁴-pregnadiene-17α,21-diol-3,20-dione-21-acetate.
13. The hydrocarbon carboxylic acid esters of less than 12 carbon atoms of 6α-fluoro-9α,11β-dichloro-Δ¹,⁴-pregnadiene-17α,21-diol-3,20-dione.
14. The hydrocarbon carboxylic acid esters of less than 12 carbon atoms of 6α-fluoro-9α,11β-dichloro-Δ¹,⁴-pregnadiene-16α,17α,21-triol-3,20-dione.
15. 6α-fluoro-9α,11β-dichloro - Δ¹,⁴ - pregnadiene - 16α,17α,21-triol-3,20-dione-16,21-diacetate.
16. 6α-fluoro-9α,11β-dichloro - Δ¹,⁴-pregnadiene-17α,21-diol-3,20-dione-21-acetate.
17. The hydrocarbon carboxylic acid esters of less than 12 carbon atoms of 6α,9α,11β-trichloro-Δ¹,⁴-pregnadiene-17α,21-diol-3,20-dione.
18. The hydrocarbon carboxylic acid esters of less than 12 carbon atoms of 6α,9α,11β-trichloro-Δ¹,⁴-pregnadiene-16α,17α,21-triol-3,20-dione.
19. The hydrocarbon carboxylic acid esters of less than 12 carbon atoms of 6α,9α,11β-trichloro-16-methyl-Δ¹,⁴-pregnadiene-17α,21-diol-3,20-dione.
20. The hydrocarbon carboxylic acid esters of less than 12 carbon atoms of the 16,17-acetonide of 6α-fluoro-9α,11β - dichloro - Δ¹,⁴ - pregnadiene - 16α,17α,21-triol-3,20-dione.
21. A compound formula:

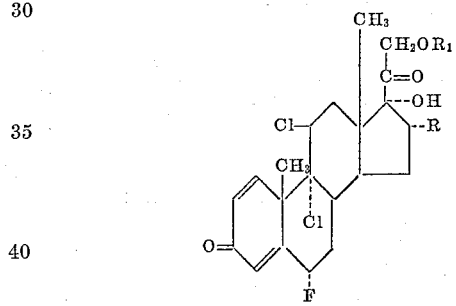

wherein R is selected from the group consisting of hydrogen and methyl and $R_1$ is selected from the group consisting of hydrogen and lower alkanoyl.
22. A compound of the following formula:

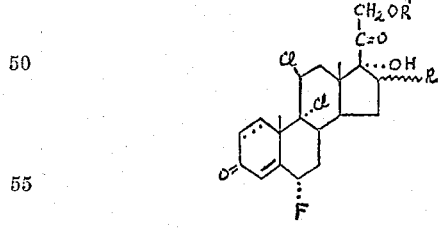

wherein the bond between carbon atoms 1 and 2 is selected from the group consisting of a single and a double bond, R is selected from the group consisting of hydrogen and methyl and $R^1$ is selected from the group consisting of hydrogen and lower alkanoyl.

References Cited by the Examiner
UNITED STATES PATENTS

| 2,894,963 | 7/59 | Gould et al. | 260—397.45 |
| 2,916,486 | 12/59 | Babcock et al. | 260—239.55 |

OTHER REFERENCES

Ringold et al.: J. A. C. S., vol. 80, 1958, p. 6464.

LEWIS GOTTS, *Primary Examiner*.

L. H. GASTON, MORRIS LIEBMAN, *Examiners*.